(12) United States Patent
Pan et al.

(10) Patent No.: US 11,898,435 B2
(45) Date of Patent: Feb. 13, 2024

(54) CORRECTING BOREHOLE IMAGES USING MACHINE-LEARNING MODELS

(71) Applicant: Halliburton Energy Services, Inc., Houston, TX (US)

(72) Inventors: Li Pan, Singapore (SG); Yijing Fan, Singapore (SG); Hsu-Hsiang Wu, Sugar Land, TX (US); Jin Ma, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 811 days.

(21) Appl. No.: 17/032,015

(22) Filed: Sep. 25, 2020

(65) Prior Publication Data

US 2022/0098972 A1   Mar. 31, 2022

(51) Int. Cl.
*E21B 47/002* (2012.01)
*G06N 3/063* (2023.01)
(Continued)

(52) U.S. Cl.
CPC ............ *E21B 47/0025* (2020.05); *G01V 3/20* (2013.01); *G06F 18/214* (2023.01); *G06N 3/04* (2013.01); *G06N 3/063* (2013.01); *E21B 47/12* (2013.01)

(58) Field of Classification Search
CPC .. E21B 47/0025; E21B 47/12; E21B 47/0228; E21B 47/085; G06N 3/063;
(Continued)

(56) References Cited

U.S. PATENT DOCUMENTS 11,320,551 B2 * 5/2022 Liu ................... G01V 1/282
11,520,077 B2 * 12/2022 Denli ................ G01V 1/28
(Continued)

FOREIGN PATENT DOCUMENTS

CA    3018284 A1 *  3/2019  ............. E21B 43/00
CA    3106591 A1 *  4/2020  ............. E21B 47/00
(Continued)

OTHER PUBLICATIONS

PCT Application No. PCT/US2021/033296, International Search Report and Written Opinion, dated Sep. 6, 2021, 11 pages.
(Continued)

*Primary Examiner* — Steven P Sax
(74) *Attorney, Agent, or Firm* — Kilpatrick Townsend & Stockton LLP (57) ABSTRACT

Borehole images can be corrected using machine-learning models. For example, a system can train a machine-learning model based on a training dataset. The training dataset can include a first set of borehole images correlated to a second set of borehole images, where the second set of borehole images are less precise versions of the first set of borehole images. The system can then execute the trained machine-learning model in relation to an input borehole image to receive a corrected borehole image as output from the trained machine-learning model. The corrected borehole image can be a visually corrected version of the input borehole image. The system may then perform one or more operations based on the corrected borehole image, such as generating a graphical user interface that includes the corrected borehole image for display on a display device.

15 Claims, 7 Drawing Sheets

(51) Int. Cl.
*G01V 3/20* (2006.01)
*G06N 3/04* (2023.01)
*G06F 18/214* (2023.01)
*E21B 47/12* (2012.01)

(58) Field of Classification Search
CPC ............ G06N 3/04; G06N 3/08; G06N 20/00; G01V 3/20; G01V 3/30; G01V 3/12; G06F 18/214; G06F 3/04812; G06F 3/0482; G06F 3/0484; G06F 3/0488; G06T 5/50; G06T 2207/20081; G06T 2207/20084; G06T 2207/20221
See application file for complete search history.

(56) References Cited

U.S. PATENT DOCUMENTS

| | | | |
|---|---|---|---|
| 2019/0034812 A1* | 1/2019 | Borrel | G01V 99/005 |
| 2019/0304063 A1 | 10/2019 | Cansizoglu | |
| 2019/0333199 A1 | 10/2019 | Ozcan et al. | |
| 2019/0391295 A1* | 12/2019 | Salman | G01V 99/005 |
| 2020/0065620 A1 | 2/2020 | Feng et al. | |
| 2020/0134803 A1* | 4/2020 | Gong | G06N 3/08 |
| 2020/0143139 A1* | 5/2020 | Mena Paz | G01V 3/18 |
| 2020/0183035 A1* | 6/2020 | Liu | G01V 1/345 |
| 2021/0041596 A1* | 2/2021 | Kushwaha | G01V 99/005 |
| 2021/0109242 A1* | 4/2021 | Salman | G01V 1/345 |
| 2021/0190664 A1* | 6/2021 | Duke | G06T 3/4007 |
| 2021/0192712 A1* | 6/2021 | Maeso | G06F 18/2431 |
| 2021/0256671 A1* | 8/2021 | Guner | G06N 3/086 |
| 2021/0293983 A1* | 9/2021 | Wei | G01V 1/301 |
| 2022/0164594 A1* | 5/2022 | LeFranc | G06V 10/774 |
| 2022/0206175 A1* | 6/2022 | Di | G01V 99/005 |

FOREIGN PATENT DOCUMENTS

| | | | | |
|---|---|---|---|---|
| CN | 105074456 A | * | 11/2015 | ........... G01N 23/046 |
| CN | 107657634 A | * | 2/2018 | ........... G06K 9/6269 |
| CN | 104050507 B | * | 3/2018 | |
| CN | 111462037 B | * | 3/2022 | ........... G06N 3/0454 |
| CN | 111583407 B | * | 5/2023 | ........... G06F 16/355 |
| CN | 111815773 B | * | 8/2023 | |
| FR | 3092425 A1 | * | 8/2020 | ............. E21B 41/00 |
| WO | WO-2020056431 A9 | * | 4/2020 | ........ G06K 9/00208 |
| WO | 2020185918 | | 9/2020 | |
| WO | WO-2020185918 A1 | * | 9/2020 | ............. G01V 99/00 |
| WO | WO-2021046366 A1 | * | 3/2021 | ............. E21B 44/02 |

OTHER PUBLICATIONS

Davies et al., "Azimuthal Resistivity Imaging: A New-Generation Laterolog", Sep. 1994, 10 pages.
Davies et al., "Well Logging for Earth Scientists", https://www.academia.edu/10768419/Well_Logging_for_Earth_Scientists.com, 2007.
Halliburton, "AFR Azimuthal Focused Resistivity Sensor", 2019, 1 page.
Schlumberger, "HRLA High-Resolution Laterolog Array Tool", Apr. 2000, 6 pages.
Smits et al., "High Resolution Form a New Laterology with Azimuthal Imaging", 1995, 14 pages.
University of Alberta, "Modelling Using Axisymmetry", 2003, 8 pages.

* cited by examiner

CORRECTING BOREHOLE IMAGES USING MACHINE-LEARNING MODELS

TECHNICAL FIELD

The present disclosure relates generally to wellbore and wellbore operations. More specifically, but not by way of limitation, this disclosure relates to correcting borehole images using machine-learning models.

BACKGROUND

Borehole images are images that include colored pixels indicating properties of a subterranean formation into which a borehole is drilled for extracting hydrocarbons from the formation. A borehole image can be a digital image that is generated by positioning an imaging tool in the borehole. The imaging tool can implement optical imaging techniques, acoustic imaging techniques, electrical imaging techniques, or a combination of these to obtain the sensor measurements used to generate the borehole image. Depending on which of these techniques is used, the resulting borehole images can convey different properties of the formation.

One example of a borehole image is a resistivity image, which has colored pixels that indicate the electrical resistivity of the formation. Resistivity images may be generated using an imaging tool that includes electrodes or induction sensors. For example, an azimuth focused resistivity (AFR) tool can be conveyed into the borehole on a logging while drilling (LWD) string. While in the borehole, the AFR tool can be rotated in the azimuthal direction. During the rotations, button electrodes of the AFR tool can transmit current through drilling fluid and into formations adjacent to the borehole. Return current is then measured by the AFR tool to determine corresponding impedance measurements. The AFR tool can then transmit the impedance measurements to a computing device. Each impedance measurement can include a real part, an imaginary part, an amplitude, a phase angle at one or more frequencies, or any combination of these. The computing device can determine one or more resistivities of the formation based on the received impedance measurements, for example by performing an inversion process. A resistivity image can then be generated based on the determined resistivities. For example, the determined resistivity values can be arranged into a two-dimensional (2D) image, where the X-axis can represent azimuthal angle, the Y-axis can represent depth in the borehole, and the value assigned to each pixel in the 2D image can be proportional to the measured impedance (e.g., in linear or logarithmic scale) at the corresponding azimuthal angle and depth.

Resistivity images and other types of borehole images can provide a wealth of information to well operators. For example, borehole images can provide valuable insights into geological attributes of the formation, such as its rock mechanics, porosity, and general condition. Borehole images can also help well operators quantify important structural and stratigraphic information like dip and azimuth of faults, fractures, bedding, and structures. Borehole images further aid in the visualization and analysis of in-situ stress, textural variations, vugs, facies, crossbedding, and more. As a result, well operators may rely on borehole images when conducting well operations, for example to optimize well placement and reduce drilling risks.

DETAILED DESCRIPTION

Certain aspects and features of the present disclosure relate to visually correcting a borehole image using a machine-learning model, such as a deep neural network, that is trained using correlated borehole images. Prior to correction, the borehole image may be inaccurate, unclear, or otherwise suboptimal as a result of any number of factors. Examples of such factors can include errors due to the finite resolution of the imaging tool that was used to generate the borehole image, errors due to imperfect calibration of the imaging tool, errors due to noise, and errors due to a simplified model being used to generate the values for the borehole image based on the measurements from the imaging tool. Given the reliance of well operators on such borehole images in performing downhole operations, it may be desirable to have a borehole image that is as high-quality as possible. So, a machine-learning model can visually correct the borehole image to improve the quality thereof. Visually correcting a borehole image can involve enhancing the visual clarity, sharpness, or accuracy of the borehole image.

As one particular example, a computing device can train a machine-learning model using a training dataset that includes correlated borehole images. The correlated borehole images can include a first set of borehole images correlated to a second set of borehole images. The first set of borehole images may be of higher quality as compared to the second set of borehole images. For example, the first set of borehole images may be more accurate, sharp, and/or clear than the second set of borehole images. In the training dataset, the second set of borehole images can serve as input images and the first set of borehole images can serve as output images. Each input image can be correlated to an output image to create an input-output image pair that serves as a single training observation in the training dataset. Given the large numbers of borehole images in the first set of borehole images and the second set of borehole images, there may be hundreds of thousands of training observations in the training dataset from which the machine-learning model can be trained.

After training the machine-learning model, the computing device can provide a borehole image as input to a machine-learning model. The borehole image may not have been seen by the machine-learning model during training. The machine-learning model can analyze features of the input borehole image and generate a corrected borehole image, which may be visually corrected in at least one way relative to the input borehole image. For example, the corrected borehole image may be visually sharper, clearer, or more accurate than the input borehole image. As a result, the corrected borehole image may be of higher quality in at least one way relative to the input borehole image. The improved quality of the corrected borehole image may allow a well operator to identify fractures, faults, or other structures that may be imperceptible from the input borehole image. This can allow the well operator to make more informed decisions when performing well operations, such as drilling operations, completion operations, and production operations. Furthermore, the image correction process performed by the trained machine-learning model may require relatively little processing time, since the more-extensive computational work was done beforehand during training. Such reduced processing requirements can allow for borehole images to be corrected rapidly, such as in real time while a well operation is ongoing.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
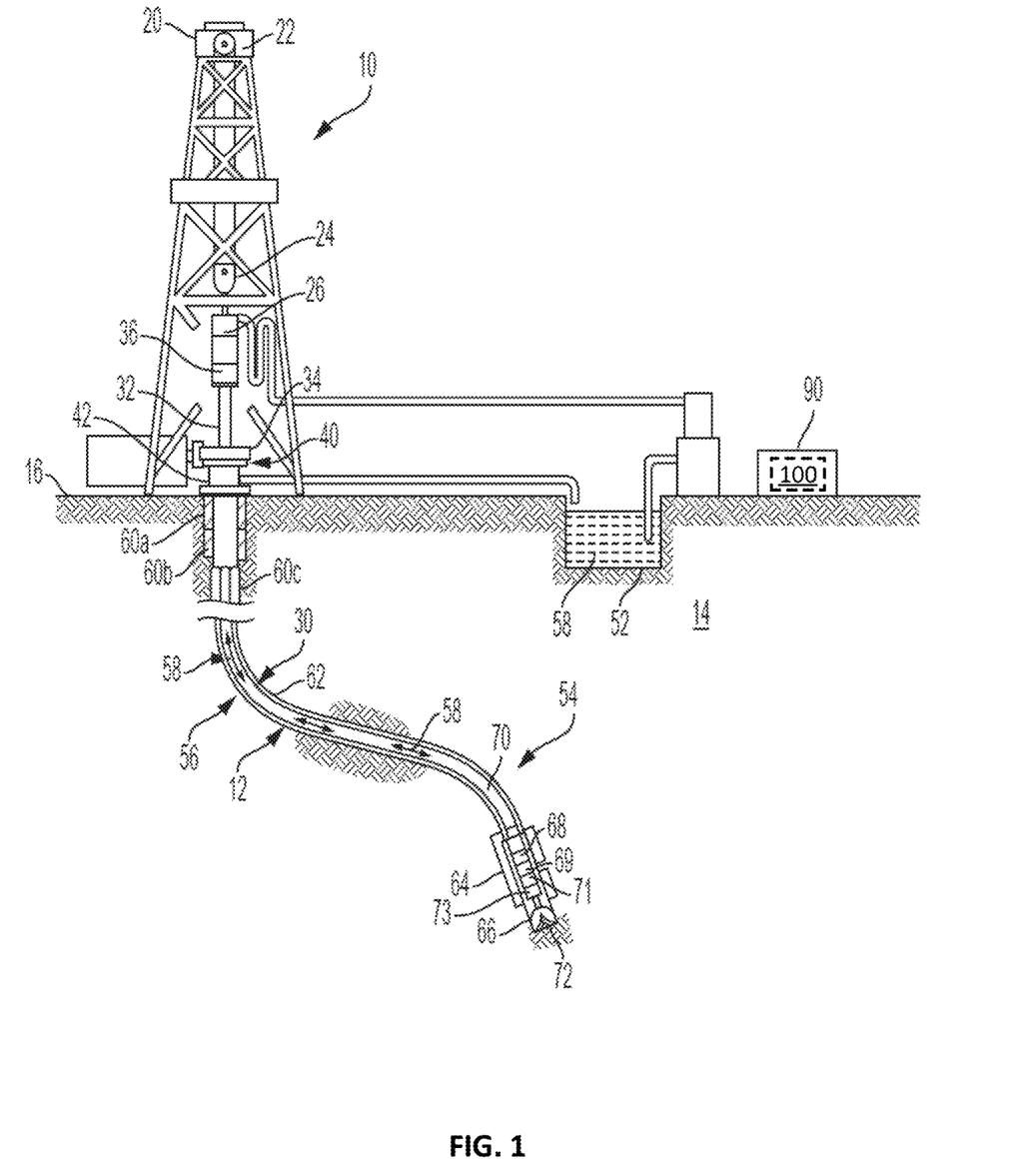
FIG. 1 shows a cross-sectional view of an example of a well system according to some aspects of the present disclosure.

FIG. 1 is a cross-sectional view of an example of a well system 10 according to some examples of the present disclosure. The well system 10 can include a wellbore 12 extending through various earth strata in a subterranean formation 14 (e.g., an oil and gas formation) located below the well surface 16. The wellbore 12 may be formed of a single bore or multiple bores extending into the formation 14, and disposed in any orientation. Although the well system 10 of FIG. 1 is illustrated as being a land-based drilling system, the well system 10 may be deployed offshore.

The well system 10 can include a derrick or drilling rig 20. The drilling rig 20 may include a hoisting apparatus 22, a travel block 24, and a swivel 26 for raising and lowering casing, drill pipe, coiled tubing, and other types of pipe or tubing strings or other types of conveyance vehicles, such as wireline, slickline, and the like. The wellbore 12 can include a drill string 30 that is a substantially tubular, axially extending drill string formed of a drill pipe joints coupled together end-to-end.

The drilling rig 20 may include a kelly 32, a rotary table 34, and other equipment associated with rotation or translation of drill string 30 within the wellbore 12. For some applications, the drilling rig 20 may also include a top drive unit 36. The drilling rig 20 may be located proximate to a wellhead 40, as shown in FIG. 1, or spaced apart from the wellhead 40, such as in the case of an offshore arrangement. One or more pressure control devices 42, such as blowout preventers (BOPs) and other well equipment may also be provided at wellhead 40 or elsewhere in the well system 10.

The well system 10 may have a pipe system 56. The pipe system 56 may include casing, risers, tubing, drill strings, subs, heads or any other pipes, tubes or equipment that attaches to the foregoing, such as the drill string 30, as well as the wellbore and laterals in which the pipes, casing, and strings may be deployed. In this regard, the pipe system 56 may include one or more casing strings 60 cemented in the wellbore 12, such as the surface 60a, intermediate 60b, and other casing strings 60c shown in FIG. 1. An annulus 62 is formed between the walls of sets of adjacent tubular components, such as concentric and non-concentric casing strings 60 or the exterior of drill string 30 and the inside wall of the wellbore 12 or the casing string 60c.

A fluid source 52 may supply any fluid utilized in wellbore operations, including drilling fluid, drill-in fluid, acidizing fluid, liquid water, steam, or some other type of fluid. For example, the fluid source 52 can supply a drilling fluid 58 pumped to the upper end of the drill string 30 and flowed through the drill string 30.

During a drilling operation, the lower end of the drill string 30 may include a bottom hole assembly 64 that includes a drill bit 66 at a distal end. The drill bit 66 may be rotated with the drill string 30 by the top drive unit 36 or the rotary table 34, or with a downhole motor 68 within the bottom hole assembly 64. A weight-on-bit is applied as the drill bit 66 is rotated, thereby enabling the drill bit 66 to engage the formation 14 and drill the wellbore 12 along a predetermined path toward a target zone. Drilling fluid 58 can also be pumped to the upper end of drill string 30 and flow through a longitudinal interior 70 of the drill string 30, through the bottom hole assembly 64, and exit from nozzles formed in the drill bit 66. At the bottom end 72 of the wellbore 12, the drilling fluid 58 may mix with formation cuttings, formation fluids and other downhole fluids and debris. The drilling fluid mixture may then flow upwardly through an annulus 62 to return formation cuttings and other downhole debris to the well surface 16.

The drill string 30 may include various other tools, such as a power source 69, a rotary steerable system 71, and measurement equipment 73. The measurement equipment 73 can include sensors configured to detect properties of the drill string 30, the wellbore 12, or the formation 14. Examples of the sensors can include voltage or current sensors, induction sensors, temperature sensors, pressure sensors, fluid-flow sensors, fluid-type sensors, accelerometers, strain gauges, gyroscopes, cameras, microphones, or any combination of these. In some examples, the measurement equipment 73 can include one or more imaging devices usable for generating borehole images. Sensor measurements and other information from the measurement equipment 73 may be transmitted uphole using electrical signals, acoustic signals, mud pulses, or other telemetry techniques.

The measurement equipment 73 can transmit (e.g., in real time) the sensor measurements to a computing device 90, which may be positioned at the well surface 16. The computing device 90 can receive the sensor measurements from the measurement equipment 73 and perform one or more operations based thereon. For example, the computing device 90 may receive sensor measurements from the measurement equipment 73 and generate borehole images based on the sensor measurements. Alternatively, the computing device 90 may receive pre-generated borehole images from the measurement equipment 73. Either way, the borehole images may be inaccurate or suboptimal for various reasons. For example, the borehole images may be generated using an imprecise calibration factor or an imprecise inversion process, leading to inaccuracies in the borehole images. As another example, the borehole images may be inaccurate due to electric current diffusion through the formation 14, which can negatively affect the sensor measurements. To mitigate these inaccuracies, the computing device 90 can execute a machine-learning model 100 to visually correct the borehole image, thereby producing a corrected borehole image. The corrected borehole image may be of higher quality than the initial borehole image. The improved borehole image may allow a well operator to identify and preempt potential problems that may not be readily perceptible by viewing the initial borehole image.

Figure 2:
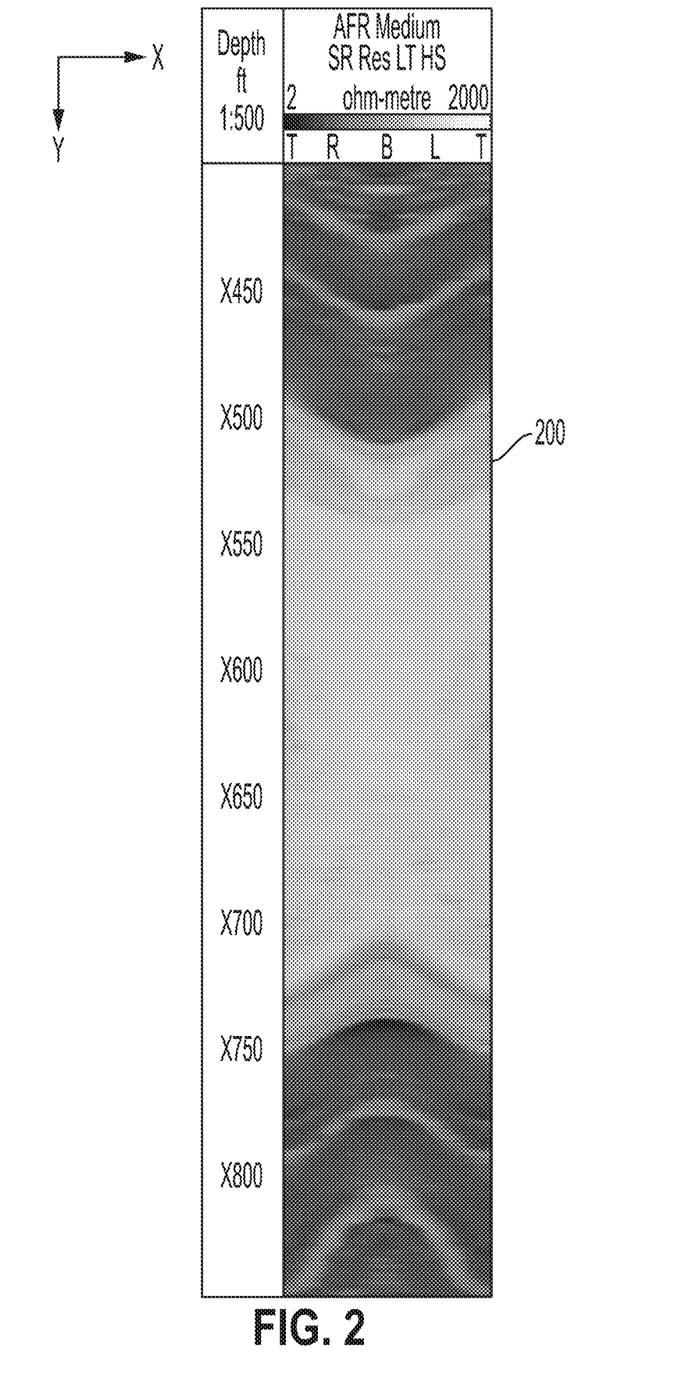
FIG. 2 shows an example of an uncorrected borehole image according to some aspects of the present disclosure.

One example of an uncorrected borehole image 200 is shown in FIG. 2. The borehole image 200 is a resistivity image in this example. The resistivity image includes colored pixels. As indicated by the legend 202, darker-colored pixels represent higher resistivity parts of a subterranean formation and lighter-colored pixels represent lower resistivity parts of the subterranean formation. The resistivity image was generated by rotating an imaging tool (e.g., an azimuth focused resistivity tool) in 360 degrees while the tool was at different depths in the borehole. The X-axis indicates rotational angle of the imaging tool in the borehole, while the Y-axis indicates the depth of the imaging tool in the borehole. As shown, depth increases down the page. Given the blurriness of some parts of the borehole image 200, it may be challenging for a well operator to identify or understand some features depicted in the borehole image 200. So, a machine-learning model 100 can be used to visually correct the borehole image 200 and thereby improve its clarity or precision.

Figure 3:
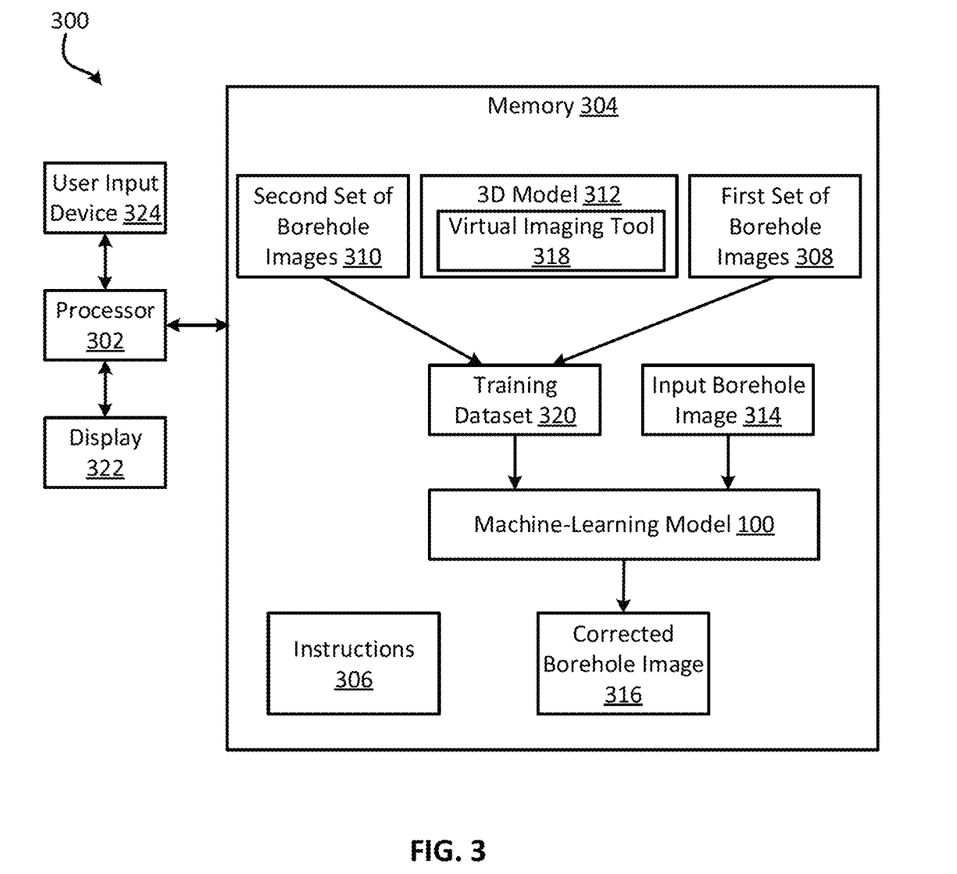
FIG. 3 shows a block diagram of an example of a system for correcting borehole images according to some aspects of the present disclosure.

One example of a system 300 for correcting such a borehole image is shown in FIG. 3. The system 300 includes a processor 302 communicatively coupled with a memory 304, a display device 322, and a user input device 324. Examples of the display device 322 can include a touchscreen display or a computer monitor. Examples of the user input device 324 can include a mouse, keyboard, touch screen, or touch pad. The processor 302, memory 304, display device 322, and user input device 324 can be parts of the same computing device (e.g., computing device 90 of FIG. 1) or they can be distributed from one another.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in any suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory can include a non-transitory computer-readable medium from which the processor 302 can read instructions 306. The non-transitory computer-readable medium can include electronic, optical, magnetic, or other storage devices capable of providing the processor 302 with computer-readable instructions or other program code. Examples of the non-transitory computer-readable medium include magnetic disk(s), memory chip(s), ROM, random-access memory (RAM), an ASIC, a configured processor, optical storage, or any other medium from which a computer processor can read the instructions 306.

Figure 4:
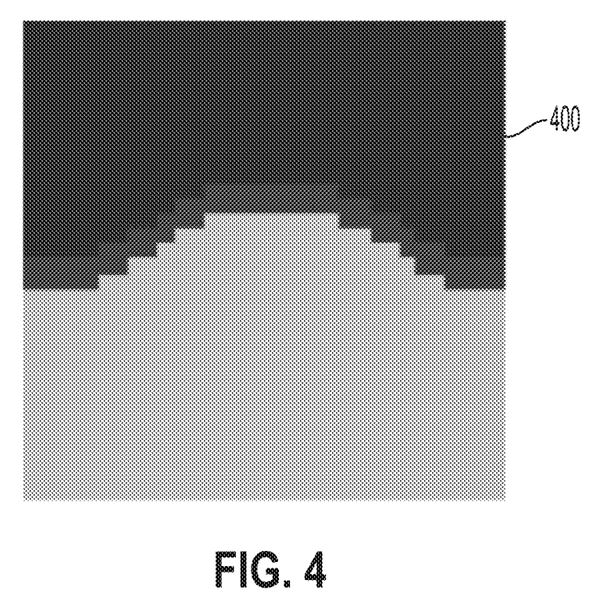
FIG. 4 shows an example of a higher-quality borehole image usable for training a machine-learning model according to some aspects of the present disclosure.

The memory 304 can include a training dataset 320 for use in training the machine-learning model 100. The training dataset 320 can include a first set of borehole images 308 that are of relatively high quality. For example, the first set of borehole images 308 can be relatively accurate, sharp, and clear. One example of such a higher-quality borehole image is shown in FIG. 4 as borehole image 400. Because the performance of the machine-learning model 100 may depend on the diversity of the underlying training dataset 320, the first set of borehole images 308 can include borehole images (e.g., tens- or hundreds-of thousands of borehole images) representing many different borehole-image patterns. For example, the first set of borehole images 308 can cover a range of conditions of interest, such as different types of formation layers, different borehole inclination angles, different resistivities and dielectric constants for each formation layer, different impurities in the formation, different stand-offs of the imaging tool, and different mud resistivities.

Figure 5:
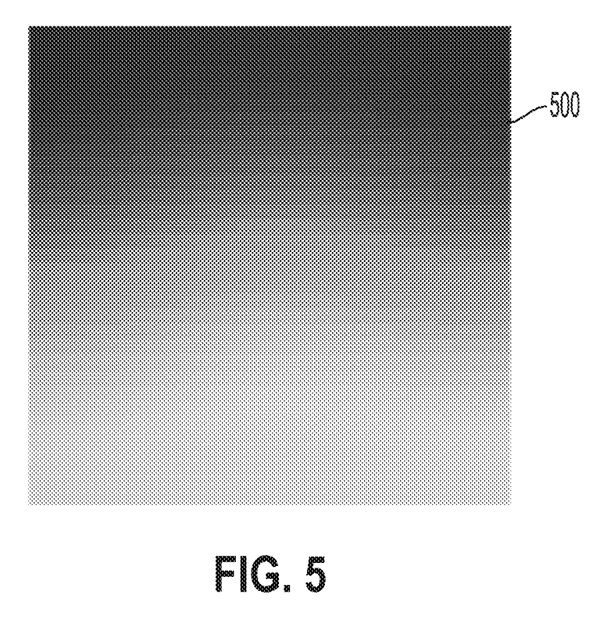
FIG. 5 shows an example of a lower-quality borehole image usable for training a machine-learning model according to some aspects of the present disclosure.

The training dataset 320 can also include a second set of borehole images 310. The second set of borehole images 310 can be less precise than the first set of borehole images 308. For example, the second set of borehole images 310 can be less clear, sharp, or accurate than the first set of borehole images 308. As a result, the second set of borehole images 310 can be of relatively lower quality that the first set of borehole images 308. One example of such a lower-quality borehole image is shown in FIG. 5 as borehole image 500.

In the training dataset 320, the first set of borehole images 308 can be correlated to the second set of borehole images 310. For example, the second set of borehole images 310 can serve as input images and the first set of borehole images 308 can serve as output images. Each input image can be correlated to an output image to create an input-output image pair that serves as a single training observation in the training dataset 320. Given the large numbers of borehole images in the first set of borehole images 308 and the second set of borehole images 310, there may be tens- or hundreds-of thousands of training observations in the training dataset 320. A larger number of training observations may yield more accurate results.

In some examples, the first set of borehole images 308 and the second set of borehole images 310 can be generated by using a formation model. For example, the processor 302 can execute a synthetic three-dimensional (3D) model 312 of a simulated formation with a borehole. From the 3D model 312, the processor 302 can generate higher-quality (e.g., more accurate) images to include in the first set of borehole images 308, since the 3D model 312 can indicate the exact properties of the formation simulated by the 3D model 312. A virtual imaging tool 318 can then be simulated in the borehole of the 3D model 312. From the virtual imaging tool 318, simulated measurements (e.g., impedance measurements) associated with the simulated formation can be obtained. The processor 302 can then perform an inversion process on the simulated measurements to generate formation-property values (e.g., resistivity values) associated with the simulated formation. Based on the formation property values, the processor 302 can generate borehole images. For example, the processor 302 can arrange the formation property values into a two-dimensional borehole image. The borehole images can be included in the second set of borehole images 310, since they may be less precise than the higher-quality images included in the first set of borehole images 308.

The processor 302 can execute a training process to train the machine-learning model 100 using the training dataset 320, thereby generating a trained machine-learning model. The training process can iterate for any number of epochs, with the goal being for the machine-learning model 100 to achieve a suitable level of accuracy. The accuracy of the machine-learning model can be evaluated using any suitable validation technique, such as k-fold cross-validation. To avoid overfitting the model, the processor 302 may stop the training process if the processor 302 determines that there has been little (e.g., less than 1%) or no accuracy improvement after the last X epochs, where X is a predefined number of consecutive epochs.

Once trained, the machine-learning model 100 can be used to visually correct a lower-quality input image to produce a higher-quality output image. For example, the machine-learning model 100 can receive a borehole image 314. Since the borehole image is provided as input to the machine-learning model 100, the borehole image 314 is also referred to herein as an input borehole image. The input borehole image 314 may be of relatively low quality, in that it may be less clear or less accurate than is desirable. Based on the input borehole image 314, the machine-learning model 110 can generate a corrected borehole image 316 as output. The corrected borehole image 316 can be visually corrected in at least one way relative to the input borehole image 314, so that the corrected borehole image 316 is of higher quality in at least one way as compared to the input borehole image 314. For example, the corrected borehole image 316 can be sharper than the input borehole image 314 or the corrected borehole image 316 can include a visual feature that is absent from the input borehole image 314.

Figure 6:
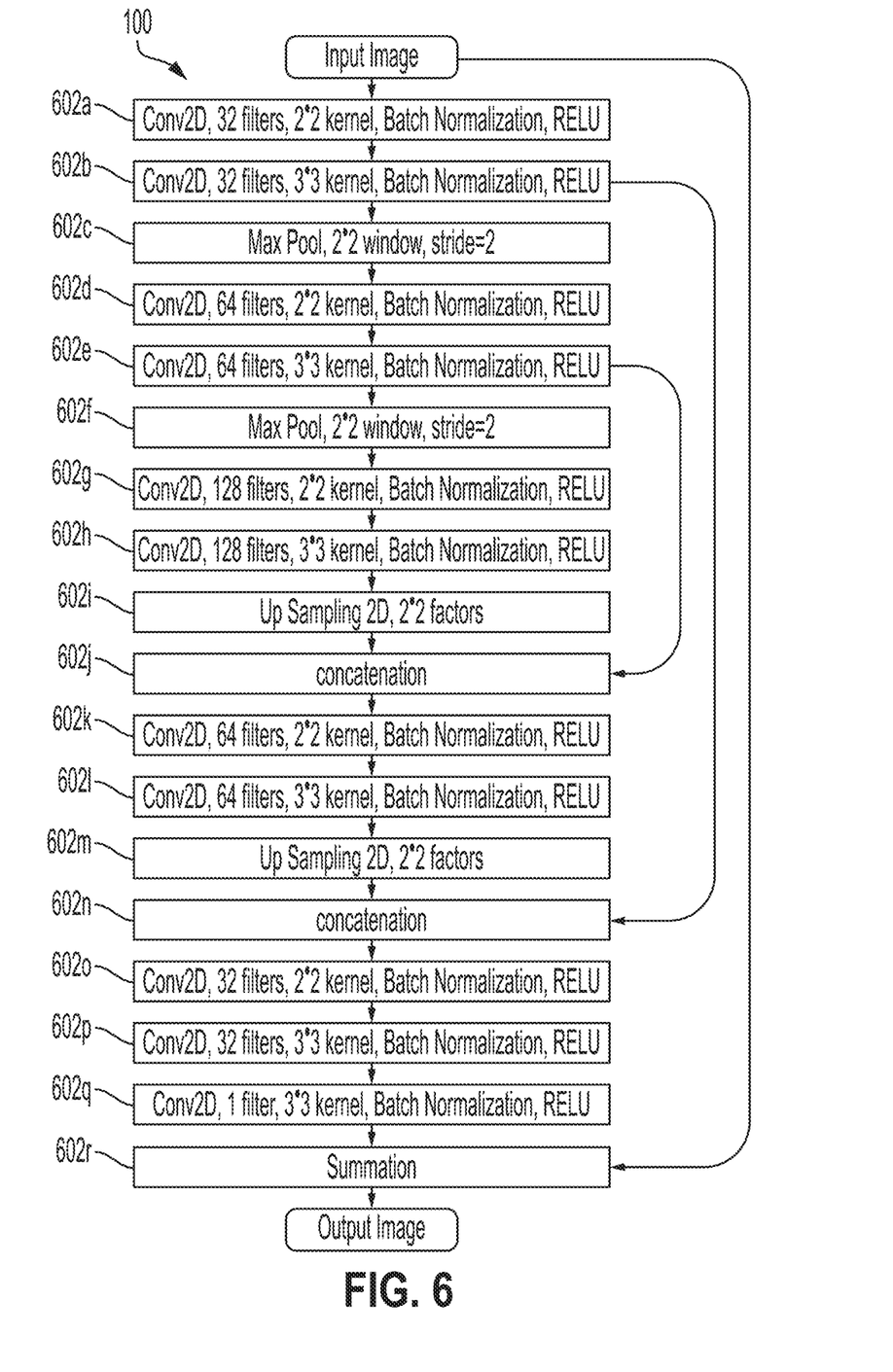
FIG. 6 shows an example of a machine-learning model according to some aspects of the present disclosure.

One example of the machine-learning model 100 is shown in FIG. 6. In this example, the machine-learning model 100 is a deep neural network that includes multiple layers 602a-r. Each layer can include nodes and edges with weights that are tuned during the training process. As shown, the layers 602a-r include multiple two-dimensional convolutional ("Conf2D") layers, batch normalization layers, multiple max-pooling ("Max Pool") layers, an up-sampling layer, multiple concatenation layers, and a summation layer, all arranged in a particular sequence.

The machine-learning model 100 can operate as follows. The machine-learning model can first convert an input image, such as a borehole image, into an input matrix on which the machine-learning model 100 can operate. The input matrix can include numerical elements representing pixel values in the input image. The input matrix may have the same number of numerical elements as there are pixels in the input image.

Next, layers 602a-b can analyze the input matrix to identify visual features in the input image. Layer 602a can be a two-dimensional convolutional layer that makes use of 32 filters, with each filter being formed from 2×2 kernels. Layer 602a can also include a batch normalization layer and a rectified linear unit (RELU). Layer 602b can be a two-dimensional convolutional layer that makes use of 32 filters, with each filter being formed from 4×4 kernels. Layer 602b can also include a batch normalization layer and a RELU. This may serve as a first analysis stage, in which the input image is analyzed in its original size to identify visual features in the input image at a first level of granularity.

Next, a max-pooling layer 602c can down-sample the matrix to yield a smaller version of the matrix that has fewer elements and that is less precise than the original matrix. The max-pooling layer 602c can use a 2×2 window and a stride of 2 for performing the max pooling. Layers 602d-e can then analyze the smaller version of the matrix with its smaller number of elements. Layer 602d can be a two-dimensional convolutional layer that makes use of 64 filters, with each filter being formed from 2×2 kernels. Layer 602d can also include a batch normalization layer and a RELU. Layer 602e can be a two-dimensional convolutional layer that makes use of 64 filters, with each filter being formed from 4×4 kernels. Layer 602e can also include a batch normalization layer and a RELU. This may serve as a second analysis stage, in which the input image is analyzed at a second level of granularity that is lower than the first level of granularity.

Next, max-pooling layer 602f can down-sample the matrix again to yield an even smaller version of the matrix that has even fewer elements and that is even less precise than the prior version of the matrix. The max-pooling layer 602f can use a 2×2 window and a stride of 2 for performing the max pooling. Layers 602g-h can analyze the even smaller version of the matrix with its even smaller number of elements. Layer 602g can be a two-dimensional convolutional layer that makes use of 128 filters, with each filter being formed from 2×2 kernels. Layer 602g can also include a batch normalization layer and a RELU. Layer 602h can be a two-dimensional convolutional layer that makes use of 128 filters, with each filter being formed from 4×4 kernels. Layer 602h can also include a batch normalization layer and a RELU. This may serve as a third analysis stage, in which the input image is analyzed at a third level of granularity that is lower than the second level of granularity. Using the above approach, the original input image can be analyzed at three different levels of granularity to identify visual features therein at different levels of abstraction.

Next, an up-sampling layer 602i can resize the matrix back to its original size, so that the matrix includes its original number of elements corresponding to the original number of pixels in the input image. In effect, the up-sampling layer 602i counters the down-sampling performed in the prior max-pooling layers 602c, 602f. The remaining layers 602j-602r can then transform the up-sampled matrix into a corrected matrix. In particular, the remaining layers can adjust the element values (e.g., corresponding to pixel colors) in the matrix based on the analysis performed in the previous layers 602a-h, through a series of concatenations and summations, to produce the corrected matrix. Finally, the machine-learning model 100 can convert the corrected matrix into a corrected output image, such as a corrected borehole image.

It will be appreciated that although FIG. 6 depicts a convolutional neural network with a specific sequence of layers, other examples may include more layers, fewer layers, different layers, or a different arrangement of the layers than is shown in FIG. 6. Additionally, other examples can involve other types of machine-learning models other than neural networks. Thus, the present disclosure is not intended to be limited to neural networks or the precise sequence of layers shown in FIG. 6.

Figure 7:
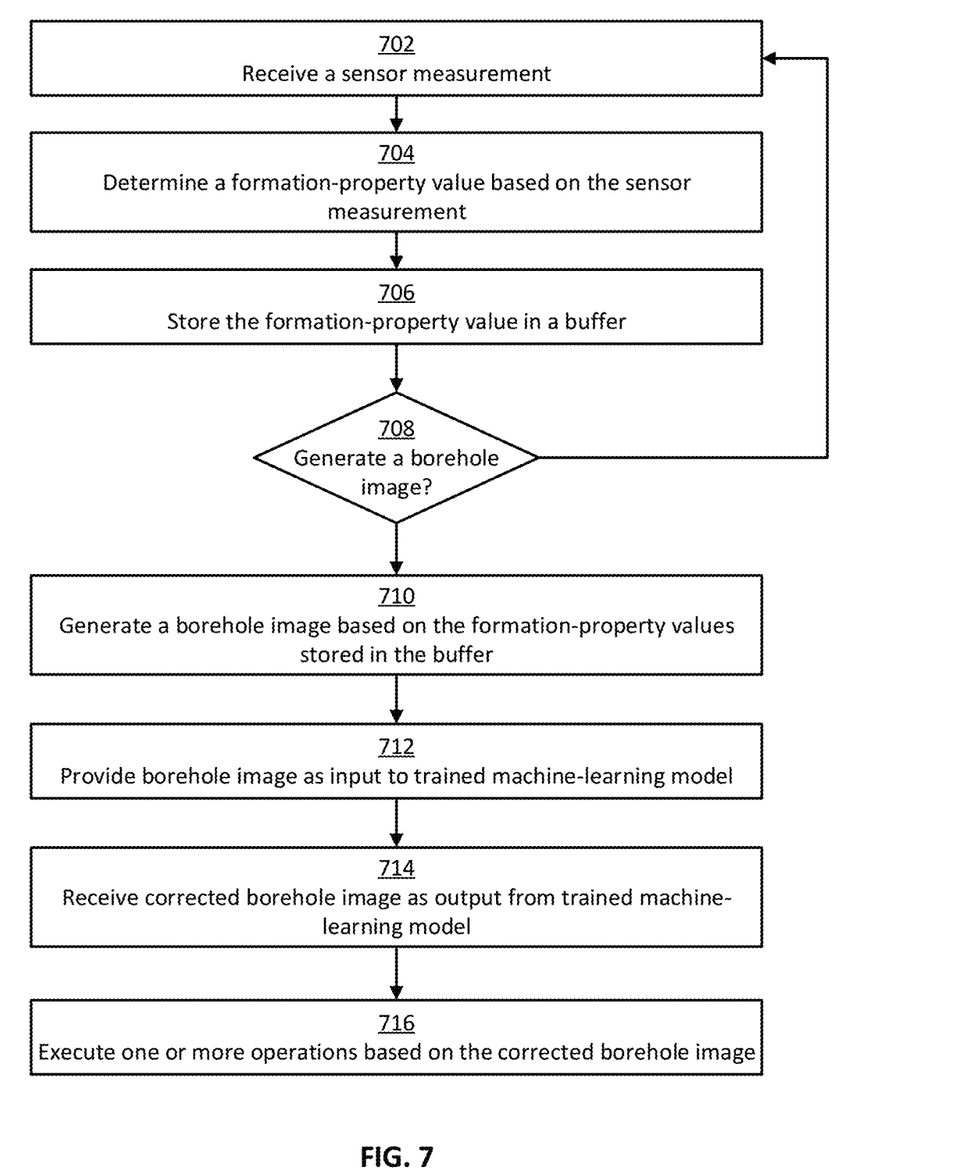
FIG. 7 shows an example of a process for correcting a borehole image according to some aspects of the present disclosure.

As noted above, the trained machine-learning model 100 can be used in a process for correcting a borehole image. One example of such a process is shown in FIG. 7. Other examples can involve more steps, fewer steps, or different steps than is depicted in FIG. 7. The steps of FIG. 7 are described below with reference to components of FIG. 3 described above.

In block 702, a processor 302 receives a sensor measurement. The sensor measurement is a measurement of a property of a formation, such as an impedance associated with the formation. The sensor measurement may have been generated by a well tool, such as an imaging tool. The processor 302 can receive the sensor measurement directly or indirectly from the well tool.

In block 704, the processor 302 determines a formation-property value based on the sensor measurement. As one particular example, the sensor measurement can be an impedance measurement indicating an electrical impedance of the formation. In some such examples, the processor 402 can perform an inversion process on the impedance measurement to generate a resistivity value suitable for use in generating a resistivity image. One example of such an inversion process can be a 3D inversion process.

In block 706, the processor 302 stores the formation-property value in a buffer in memory, such as memory 304. The buffer can be of a fixed size for storing a predefined number of sensor measurements.

In block 708, the processor 302 determines if a borehole image is to be generated. The processor 302 can determine that a borehole image is to be generated in response to detecting that the buffer is full, that the buffer includes a predefined number of formation-property values, or another condition. If the processor 302 determines that a borehole image is to be generated, the process can continue on to block 710. Otherwise, the process can return to block 702, at which point blocks 702-708 can iterate in relation to another sensor measurement.

In block 710, the processor 302 generates a borehole image 314 based on the formation-property values stored in the buffer. For example, the processor 302 can set the pixel colors in the borehole image 314 based on the formation-property values in the buffer, such that the color of each pixel is determined based on a formation-property value in the buffer. At this stage, the borehole image 314 may be blurry, inaccurate, missing visual features, or otherwise suboptimal.

In block 712, the processor 302 provides the borehole image 314 as input to a trained machine-learning model 110 to receive a corrected borehole image 316 as output from the trained machine-learning model 110. The trained machine-learning model 110 may have been previously trained using a training dataset 320, as detailed above. In some examples, the image correction process performed by the trained machine-learning model 110 may require relatively little processing time, since the more-extensive computational work was done beforehand during training. This may allow for borehole images to be corrected in real time, such as while a well operation is ongoing.

In block 714, the processor 302 executes one or more operations based on the corrected borehole image 316. For example, the processor 302 can generate a graphical user interface that includes the corrected borehole image 316 for display on a display device 322. This may enable a well operator to view and make operational decisions based on the corrected borehole image 316. Additionally or alternatively, the processor 302 can store the corrected borehole image 316 in a database or a storage device, such as memory 304. This may allow the corrected borehole image 316 to be subsequently analyzed by the well operator or software. Additionally or alternatively, the processor 302 can generate a control signal based on the corrected borehole image 316. The control signal may include one or more commands. The processor 302 can then transmit the control signal to a well tool for causing the well tool to adjust at least one of its operating parameters. Examples of the well tool can include a valve, a pump, a drilling system, or a measurement system. In this way, the processor 302 can automatically control well operations based on the corrected borehole image 316. This may create a feedback loop through which well operations can be adjusted (e.g., in real time) based on borehole images.

Figure 8:
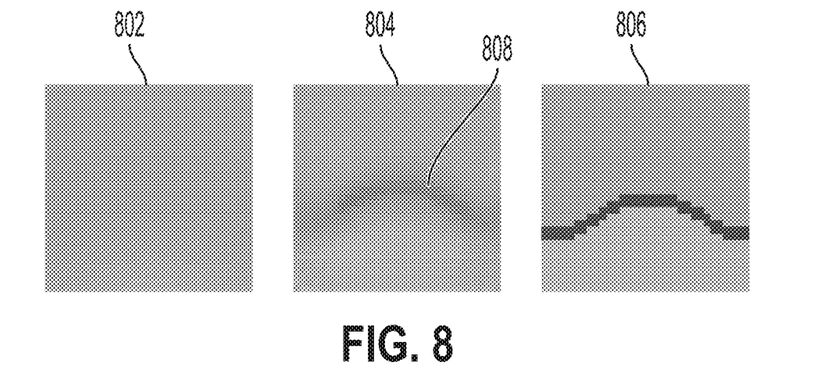
FIG. 8 shows an example of an improvement to a borehole image made by implementing some aspects of the present disclosure.
Figure 9:
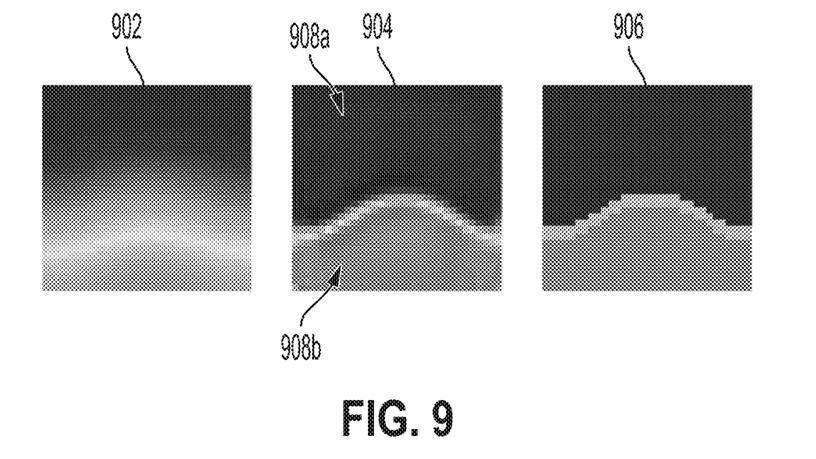
FIG. 9 shows another example of an improvement to a borehole image made by implementing some aspects of the present disclosure.
Figure 10:
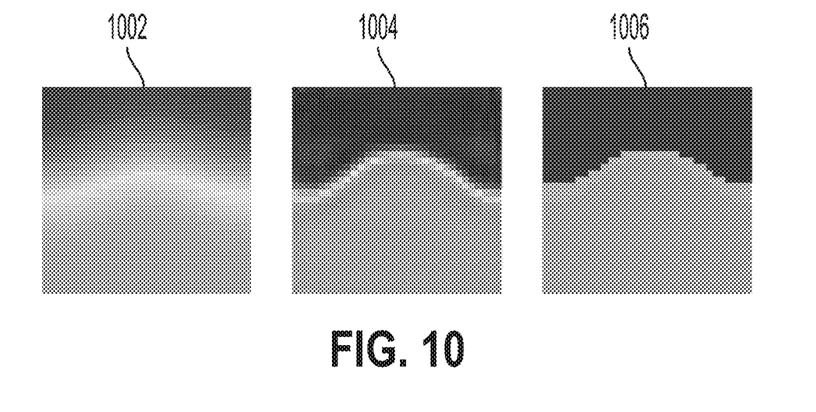
FIG. 10 shows yet another example of an improvement to a borehole image made by implementing some aspects of the present disclosure.

To illustrate the image correction described above, some examples of original borehole images and corrected borehole images are provided in FIGS. 8-10. In particular, FIG. 8 shows an original borehole image 802 (before correction) and a corrected borehole image 804 generated using a machine-learning model as described herein. It is apparent that the corrected borehole image 804 approximates an ideal version of the borehole image 806 better than the original borehole image 802, at least because the corrected borehole image 804 includes a visual feature 808 that is absent from the original borehole image 802. In this example, the visual feature 808 indicates a thin layer of very low resistivity in the formation, but the visual feature 808 may indicate other information in other examples. FIG. 9 also shows an original borehole image 902 and a corrected borehole image 904 generated using a machine-learning model. The corrected borehole image 904 again approximates an ideal version of the borehole image 906 better than the original borehole image 902, at least because the corrected borehole image 904 is sharper and clearer than the original borehole image 902. For example, a boundary between two bed layers 908*a-b* in a formation is more clearly shown in the corrected borehole image 904 than in the original borehole image 902. FIG. 10 shows a similar improvement. The corrected borehole image 1004 approximates an ideal version of the borehole image 1006 better than the original borehole image 1002, at least because the corrected borehole image 1004 is sharper and clearer than the original borehole image 1002. Thus, some examples of the present disclosure can meaningfully improve the visual characteristics of borehole images so that they provide more information or better-quality information than the original borehole images. This can enable well operators (or software that uses borehole images) to make better-informed decisions in relation to well operations, which can have a significant real-world impact on the drilling, completion, and production of hydrocarbon wells.

In some aspects, systems, methods, and non-transitory computer-readable mediums for correcting borehole images using machine-learning models are provided according to one or more of the following examples:

Example #1: A system can include a processor and a memory. The memory can include instructions that that are executable by the processor for causing the processor to perform operations. The operations can include training a machine-learning model based on a training dataset to generate a trained machine-learning model. The training dataset can include a first set of borehole images correlated to a second set of borehole images. The second set of borehole images can be less precise versions of the first set of borehole images. The operations can include executing the trained machine-learning model in relation to an input borehole image to receive a corrected borehole image as output from the trained machine-learning model. The corrected borehole image can be a visually corrected version of the input borehole image. The operations can include generating a graphical user interface that includes the corrected borehole image for display on a display device.

Example #2: The system of Example #1 may feature the input borehole image being a two-dimensional digital image that includes colored pixels representing a property of a subterranean formation into which a borehole is drilled for extracting hydrocarbons from the subterranean formation. The corrected borehole image can also be a two-dimensional digital image.

Example #3: The system of Example #2 may feature the input borehole image being a resistivity image and the property being a resistivity of the subterranean formation.

Example #4: The system of any of Examples #1-3 may feature an imaging tool positionable in the borehole. The memory can further include instructions that are executable by the processor for causing the processor to generate the input borehole image based on sensor measurements from the imaging tool.

Example #5: The system of any of Examples #1-4 may feature the machine-learning model being a convolutional neural network that includes a convolutional layer, a batch normalization layer, a concatenation layer, a summation layer, a max pooling layer, and an up-sampling layer.

Example #6: The system of any of Examples #1-5 may feature the memory further including instructions that are executable by the processor for causing the processor to generate the first set of borehole images and the second set of borehole images based on a three-dimensional model of a simulated formation. The three-dimensional model can be different from the machine-learning model.

Example #7: The system of Example #6 may feature the three-dimensional model including a virtual imaging tool. The memory can further include instructions that are executable by the processor for causing the processor to receive simulated measurements of a property of the simulated formation; and generate the second set of borehole images based on the simulated measurements.

Example #8: The system of Example #7 may feature the memory further including instructions that are executable by the processor for causing the processor to generate the second set of borehole images by performing an inversion process on the simulated measurements.

Example #9: The system of any of Examples #1-8 may feature the corrected borehole image being more accurate than the input borehole image.

Example #10: A method can include training a machine-learning model based on a training dataset to generate a trained machine-learning model. The training dataset can include a first set of borehole images correlated to a second set of borehole images. The second set of borehole images can be less precise versions of the first set of borehole images. The method can include executing the trained machine-learning model in relation to an input borehole image to receive a corrected borehole image as output from the trained machine-learning model. The corrected borehole image can be a visually corrected version of the input borehole image. The method can include generating a graphical user interface that includes the corrected borehole image for display on a display device. Some or all of the method steps may be implemented by a processor.

Example #11: The method of Example #10 may involve the input borehole image being a digital image that includes colored pixels representing a property of a subterranean formation. The corrected borehole image can be a two-dimensional digital image.

Example #12: The method of Example #11 may involve the property including a resistivity of the subterranean formation.

Example #13: The method of any of Examples #10-12 may involve generating the input borehole image based on sensor measurements from an imaging tool in a borehole.

Example #14: The method of any of Examples #10-13 may involve generating the first set of borehole images and the second set of borehole images based on a three-dimensional model of a simulated formation. The three-dimensional model can be different from the machine-learning model.

Example #15: The method of Example #14 may involve the three-dimensional model including a virtual imaging tool. The method may further include receiving simulated measurements of a property of the simulated formation; and generating the second set of borehole images based on the simulated measurements.

Example #16: The method of Example #15 may involve generating the second set of borehole images by performing an inversion process on simulated measurements.

Example #17: The method of any of Examples #10-16 may involve the corrected borehole image having a higher resolution than the input borehole image, or the corrected borehole image including a visual feature that is absent from the input borehole image.

Example #18: A non-transitory computer-readable medium can include program code that is executable by a processor for causing the processor to generate a corrected borehole image based on an input borehole image. The corrected borehole image can be visually corrected in at least one way relative to the input borehole image. The program code can also cause the processor to execute one or more operations based on the corrected borehole image.

Example #19: The non-transitory computer-readable medium of Example #18 may further include program code that is executable by the processor for causing the processor to train a machine-learning model based on a training dataset to generate the trained machine-learning model. The training dataset can include a first set of borehole images correlated to a second set of borehole images. The second set of borehole images can be less precise versions of the first set of borehole images.

Example #20: The non-transitory computer-readable medium of any of Examples #18-19 may feature the one or more operations involving generating a graphical user interface including the corrected borehole image for display on a display device.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processor; and
a memory including instructions that are executable by the processor for causing the processor to:
generate a training dataset using a three-dimensional model, the three-dimensional model being for simulating a tool in a geological subterranean formation;
train a machine-learning model based on the training dataset to generate a trained machine-learning model, the machine-learning model being different than the three-dimensional model, the training dataset including a first set of borehole images correlated to a second set of borehole images, the second set of borehole images being less precise versions of the first set of borehole images;
execute the trained machine-learning model in relation to an input borehole image to receive a corrected borehole image as output from the trained machine-learning model, the corrected borehole image being a visually corrected version of the input borehole image, wherein the input borehole image is a two-dimensional digital image that includes colored pixels representing a property of a subterranean formation into which a borehole is drilled for extracting hydrocarbons from the subterranean formation, and wherein the corrected borehole image is also a two-dimensional digital image; and generate a graphical user interface that includes the corrected borehole image for display on a display device.

2. The system of claim 1, wherein the input borehole image is a resistivity image and the property is a resistivity of the subterranean formation.

3. The system of claim 1, further comprising an imaging tool positionable in the borehole, wherein the memory further includes instructions that are executable by the processor for causing the processor to generate the input borehole image based on sensor measurements from the imaging tool.

4. The system of claim 1, wherein the machine-learning model is a convolutional neural network that includes a convolutional layer, a batch normalization layer, a concatenation layer, a summation layer, a max pooling layer, and an up-sampling layer.

5. The system of claim 1, wherein the tool includes a virtual imaging tool, and wherein the memory further includes instructions that are executable by the processor for causing the processor to:
receive simulated measurements of the property of the geological subterranean formation; and
generate the second set of borehole images based on the simulated measurements.

6. The system of claim 5, wherein the memory further includes instructions that are executable by the processor for causing the processor to generate the second set of borehole images by performing an inversion process on the simulated measurements.

7. The system of claim 1, wherein the corrected borehole image is more accurate than the input borehole image.

8. A method comprising:
generating, by a processor, a training dataset using a three-dimensional model, the three-dimensional model being for simulating a tool in a geological subterranean formation;
training, by the processor, a machine-learning model based on the training dataset to generate a trained machine-learning model, the machine-learning model being different than the three-dimensional model, the training dataset including a first set of borehole images correlated to a second set of borehole images, the second set of borehole images being less precise versions of the first set of borehole images;
executing, by the processor, the trained machine-learning model in relation to an input borehole image to receive a corrected borehole image as output from the trained machine-learning model, the corrected borehole image being a visually corrected version of the input borehole image, wherein the input borehole image is a two-dimensional digital image that includes colored pixels representing a property of a subterranean formation into which a borehole is drilled for extracting hydrocarbons from the subterranean formation, and wherein the corrected borehole image is also a two-dimensional digital image; and
generating, by the processor, a graphical user interface that includes the corrected borehole image for display on a display device.

9. The method of claim 8, wherein the property includes a resistivity of the subterranean formation.

10. The method of claim 8, further comprising generating the input borehole image based on sensor measurements from an imaging tool in the borehole.

11. The method of claim 8, wherein the tool includes a virtual imaging tool, and further comprising:
receiving simulated measurements of the property of the geological subterranean formation; and
generating the second set of borehole images based on the simulated measurements.

12. The method of claim 11, further comprising generating the second set of borehole images by performing an inversion process on the simulated measurements.

13. The method of claim 8, wherein the corrected borehole image has a higher resolution than the input borehole image, or the corrected borehole image includes a visual feature that is absent from the input borehole image.

14. A non-transitory computer-readable medium comprising program code that is executable by a processor for causing the processor to:
generate a training dataset using a three-dimensional model, the three-dimensional model being for simulating a tool in a geological subterranean formation;
train a machine-learning model based on the training dataset to generate a trained machine-learning model, the machine-learning model being different than the three-dimensional model, the training dataset including a first set of borehole images correlated to a second set of borehole images, the second set of borehole images being less precise versions of the first set of borehole images;
execute the trained machine-learning model to generate a corrected borehole image based on an input borehole image, the corrected borehole image being visually corrected in at least one way relative to the input borehole image, wherein the input borehole image is a two-dimensional digital image that includes colored pixels representing a property of a subterranean formation into which a borehole is drilled for extracting hydrocarbons from the subterranean formation, and wherein the corrected borehole image is also a two-dimensional digital image; and
execute one or more operations based on the corrected borehole image.

15. The non-transitory computer-readable medium of claim 14, wherein the one or more operations involves generating a graphical user interface including the corrected borehole image for display on a display device.

* * * * *